Patented June 6, 1944

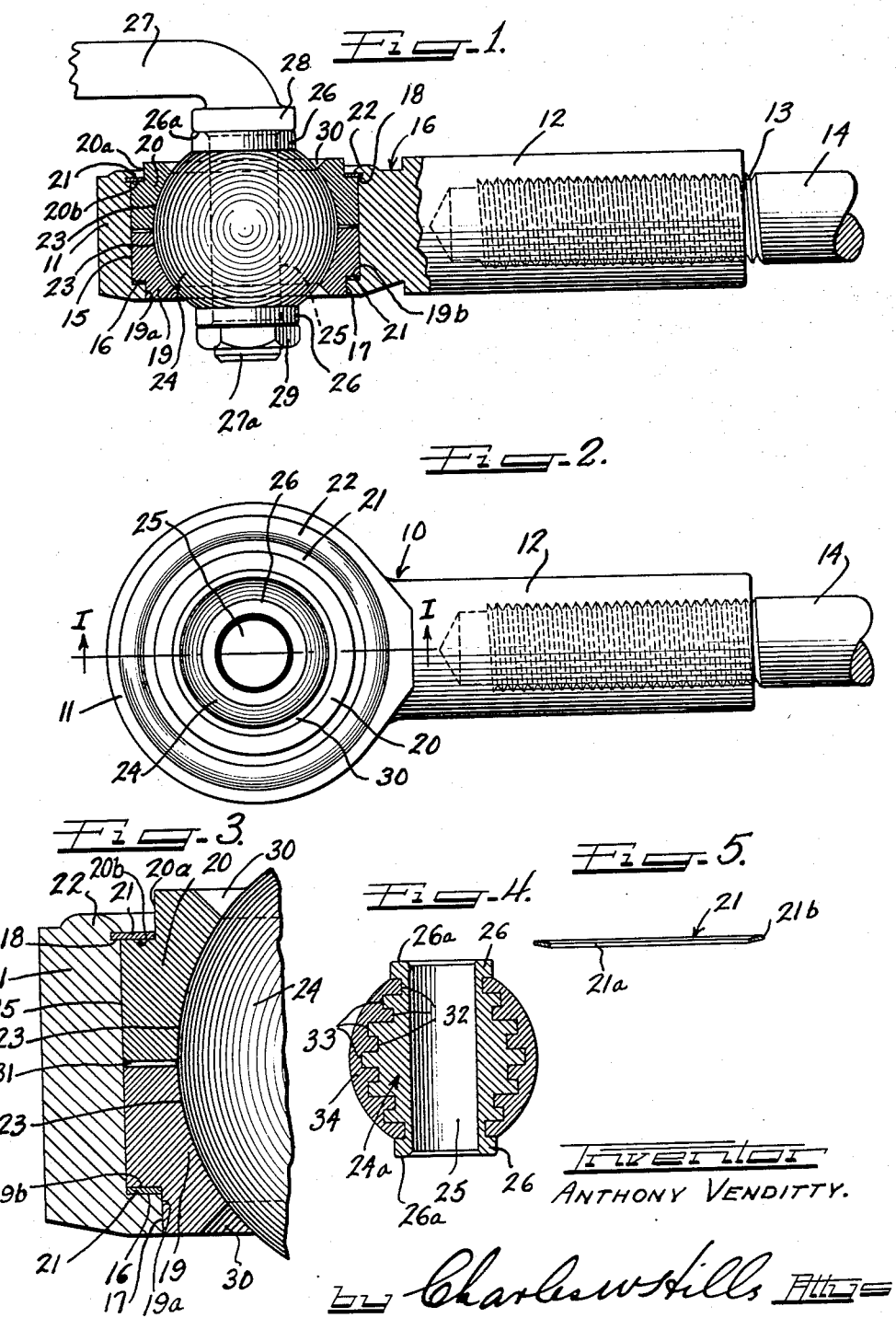

2,350,482

UNITED STATES PATENT OFFICE 2,350,482

BALL JOINT

Anthony Venditty, Detroit, Mich., assignor to Thompson Products Incorporated, Cleveland, Ohio, a corporation of Ohio Application May 2, 1942, Serial No. 441,509

9 Claims. (Cl. 287—90)

This invention relates to a joint construction especially useful in airplane control rod assemblies.

More specifically the invention relates to a ball joint construction wherein the ball of the joint has an oilless bearing material surface riding in a metal socket composed of complementary seating rings urged into proper engagement with the ball by spring washers.

Small joint assemblies are utilized in many rod controls of automotive vehicles and airplanes. The present invention provides a simple, inexpensive, and efficiently operating ball and socket joint for control rod linkages.

The joint of this invention includes a housing member with an eye end receiving a pair of opposed bearing rings together defining a spherical seat for a ball. The housing has an internally threaded shank for receiving one control rod. The ball has a bore therethrough terminating in flat faced collars or bosses integrally affixed to the ball. A second control rod can extend through this bore and have abutment means thereon for coacting with the collars. The ball is free to move in the bearing rings and these rings are urged into proper bearing engagement with the ball by spring washers interposed between the rings and shoulders provided in the eye portion of the housing. One of the spring type washers can be used as a means for locking the bearing rings in the eye end of the housing.

In accordance with the preferred embodiment of the invention the ball can be covered with an oilless bearing material or can, if desired, be composed, in its entirety, of oilless bearing material.

It is, then, an object of the invention to provide a ball joint especially useful for control rod linkages.

A further object of the invention is to provide a compact ball joint assembly utilizing spring washers to accommodate differences in sizes of the bearing parts so that careful tolerance limits are not essential.

A still further object of the invention is to provide a ball joint having the ball member thereof equipped with an oilless metal bearing surface and having the socket member thereof composed of opposed bearing rings.

A still further object of this invention is to provide a ball joint socket wherein a housing member has an eye end receiving a pair of opposed bearing rings together defining a segmental spherical seat in the housing.

Other and further objects of the invention will be apparent to those skilled in the art from the following detailed description of the annexed sheet of drawings which, by way of preferred examples, illustrates two embodiments of the invention.

On the drawing:

Figure 1 is a side elevational view of a ball and socket joint assembly according to this invention mounted in a control rod linkage, with a part of the joint shown in vertical cross section along the line I—I of Figure 2.

Figure 2 is a plan view of the joint construction shown in Figure 1.

Figure 3 is an enlarged fragmentary vertical cross-sectional view with parts in elevation, of the joint construction shown in Figures 1 and 2.

Figure 4 is a vertical cross-sectional view of a modified form of ball for the joints of this invention.

Figure 5 is a vertical cross-sectional view taken through one of the spring washers used in the joints of this invention.

As shown on the drawing:

The joint, as shown in Figures 1 to 3, includes a housing member 10 having an eye end 11 and a laterally extending cylindrical shank 12 integral with said end 11. The shank 12 is internally threaded to receive the threaded end 13 of a rod 14.

The eye end 11 of the housing has a cylindrical bore 15 therethrough normal to the shank 12. The bore 15 is bottomed by a shoulder 16 which extends inwardly around the periphery of the housing to provide a reduced opening 17 at the bottom of the housing.

The top of the bore 15 is counterbored to provide a shoulder 18.

A pair of seating rings 19 and 20 have external diameters fitting the bore 15 and reduced diameter end portions 19a and 20a. The portion 19a of the bearing ring 19 snugly fits the opening 17 of the housing. The reduced portion 20a of the bearing ring 20 projects through the top of the housing.

A spring washer 21 is seated on the shoulder 16 of the housing to receive the shoulder 19b of the bearing ring 19 thereon. The shoulder 19b extends inwardly from the outer diameter of the bearing ring to the reduced diameter 19a of the bearing ring.

As shown in Figure 5, the spring washer 21 in its free condition is dished so that its inner rim 21a is at a level offset from the level of the outer rim 21b. When the washer is flattened it has a tendency to spring back to its free position and, in so doing, has a spring effect on parts which abut the same.

A second spring washer 21 is seated on the top shoulder 18 of the housing and extends over the shoulder 20b of the seat ring 20. The top rim of the housing is spun or peened over the outer marginal portion of this second washer 21 as at 22 to lock the washer in position against the shoulder and thereby hold the seating ring 20 in the housing.

The seating rings, when thus positioned in the eye end of the housing, are urged toward each other.

Each seating ring has an internal segmental spherical bearing surface 23. This bearing surface has its major diameter positioned at the longitudinal center of the eye end 11 preferably on the axial plane of the shank 12.

A metal ball 24 is seated in the bearing rings 19 and 20 on the segmental spherical surfaces 23 thereof. The metal ball 24 has a bore 25 therethrough. This bore extends through the center of the ball. Collars 26 are formed integral with opposite sides of the ball at the ends of the bore and are apertured to continue the bore to their flat outer faces 26a. If desired, of course, the collars 26 could be welded or otherwise secured to the ball 24.

A second rod 27 as shown in Figure 1 is articulately joined with the rod 14 by providing an offset threaded end portion 27a thereon. The offset portion extends through the collars and bore. An abutment collar or nut 28 is formed integral with or provided on the rod 27 to thrust against a collar 26. A nut 29 can be threaded on the free end of the offset portion 27a to abut the other collar 26.

The rods 14 and 27 are thus joined in universal relation since the ball can rotate and tilt in all planes relative to the housing. If desired the outer ends of the seating rings 19 and 20 can be beveled as at 30 to permit a wider degree of angulation of the rod since the collars 26 can move into the beveled portions of the rings.

The spring washers 21 will urge the rings 19 and 20 toward each other and, since they are flattened when assembled in the eye of the housing, they serve to anchor the seating rings against rotation relative to the bore 15. One of the washers 21 cooperates with the peened end 22 of the housing 11 to hold the bearing rings in the housing.

As shown in Figure 3, if the ball 24 is somewhat oversize so as to hold the seating rings 19 and 20 in spaced opposed relation, the washers 21 will constantly urge the bearing rings toward each other so as to accommodate any wear developed on the bearing surfaces between the ball and the ring. The washers in such instance act as automatic wear take-up members, tending to close up the gap 31 between the rings.

It is preferred to form the ball 24 of an oilless bearing material such as graphite-impregnated bronzes or the like. The seating rings 19 and 20 can be formed of steel.

In the embodiment shown in Figure 4, the ball 24a can have a series of grooves 32 therearound decreasing in diameter from the great circle of the ball. These grooves open outwardly and are bounded by annular ribs 33. Oilless bearing material 34 is cast in or impounded in the grooves 32 and extends outwardly to cover the ribs 33 so as to present a spherical exterior surface for the ball member completely covering the body metal of the ball. This oilless bearing material thereby need only form an exterior cover for the ball and the ball can have a composite structure.

From the above descriptions it will be understood that an exceedingly simple, and inexpensive joint construction has been provided for articulately joining a plurality of rods such as airplane control rods. The joints of this invention can be quite small, having an over-all length of about an inch and three quarters and a ball diameter of about a half inch.

It will, of course, be understood that various details of the invention may be varied through a wide range without departing from the principles of this invention and it is, therefore, not the purpose to limit the patent granted hereon otherwise than necessitated by the scope of the appended claims.

I claim as my invention:

1. A ball and socket joint construction comprising a housing having a bore therethrough with an inturned shoulder at one end thereof and a countersunk enlarged portion at the other end thereof, a spring washer seated on said shoulder, a seating ring in said housing abutting said spring washer, a second seating ring in said housing cooperating with the first mentioned seating ring to define a ball socket in the housing, a second washer seated in said countersunk portion of the housing and extending over a portion of the second seating ring, said housing being spun over the marginal peripheral portion of the second spring washer to secure the washer to the housing and thereby hold the seating rings in the housing, a ball member mounted in the socket provided by the seating rings, said ball member having a bore extending therethrough, collars on said ball member at the ends of said bore presenting flat outer faces, said collars being apertured to continue said bore of the ball to the flat outer faces thereof, a rod extending through said bore, abutment means on said rod thrusting against the flat outer faces of said collars, a shank extending from said housing, and an internally threaded wall in said shank adapted to receive a second rod.

2. A ball for a ball and socket joint construction comprising a metal member having a series of annular grooves decreasing in diameter from a central groove and bounded by ribs of decreasing diameter extending from said central groove, and an oilless bearing metal anchored in said grooves and covering said ribs to present a spherical surface on said metal member.

3. A ball and socket joint comprising a housing having a bore therethrough with an inturned shoulder at one end thereof, a spring washer seated on said shoulder, a first bearing ring slidably mounted in said housing and bottomed on said spring washer, a second bearing ring slidably mounted in said housing in spaced relation from said first bearing ring and cooperating with the first bearing ring to define a ball socket in the housing, a second washer secured in said housing to overlap said second bearing ring for holding both bearing rings in the housing, and a ball in the ball socket defined by said bearing rings, said spring washer being compressed between the inturned shoulder and the first bearing ring for urging the first bearing ring toward the second bearing ring to decrease the space between the bearing rings and take up wear between the ball and ball socket.

4. A ball and socket joint comprising a housing, a pair of opposed bearing rings in said housing cooperating to define a ball socket, a ball in said ball socket having a bore extending therethrough, collars on said ball at the ends of the bore presenting thrust faces, said collars being apertured to continue said bore of the ball to said thrust faces, and a rod member extending through said bore having abutment means thereon thrusting against said thrust faces of said collars.

5. A ball construction adapted for a ball and socket joint which comprises a metal sleeve having spaced external annular ribs successively increasing in diameter from the ends of the sleeve and providing grooves therebetween, and bearing material surrounding said sleeve anchored thereto and covering the ribs, said bearing material providing a spherical surface on said sleeve.

6. A ball construction adapted for a ball and socket joint which comprises a core having a series of spaced annular grooves successively increasing in diameter from the ends of the core, ribs adjacent each groove successively increasing in diameter from the ends of the core, and a ball of bearing material around said core seated in said grooves and covering said ribs to present a spherical external surface.

7. A ball and socket joint construction comprising a housing having a cylindrical bore therethrough with an inturned shoulder at one end thereof and a countersunk enlarged portion at the other end thereof, a pair of normally spaced apart bearing rings having outer cylindrical walls slidably engaging the cylindrical bore of the housing and having fragmental spherical inner walls cooperating to define a ball socket, said bearing rings having reduced diameter cylindrical end portions, flat outer annular shoulders on said bearing rings at the inner ends of said reduced diameter cylindrical end portions, one of said shoulders being adjacent the inturned shoulder of the housing, a spring washer disposed around the reduced diameter cylindrical end portion of the bearing ring having the shoulder adjacent said inturned shoulder of the housing, said spring washer being bottomed on said shoulder of the housing and acting on said shoulder of the bearing ring to urge the bearing ring toward the other bearing ring, a washer disposed around the reduced diameter end portion of the other bearing ring and having an inner marginal portion overlying the shoulder of said other bearing ring and an outer marginal portion extending into the countersunk enlarged portion of the housing, said housing being spun over the outer marginal portion of said washer to cooperate with said shoulder of the housing for retaining said bearing rings in the housing, a ball member movably mounted in the ball socket provided by said bearing rings, and said spring washer being effective for taking up wear between the ball member and ball socket by urging the bearing rings toward each other for decreasing the space therebetween.

8. A ball and socket joint construction which comprises a ball member having a bore therethrough, apertured bosses on opposite sides of said ball member having outer abutment faces and continuing said bore to said faces, a pair of spaced opposed bearing rings surrounding said ball and cooperating to provide a ball socket, a housing slidably retaining said bearing rings, resilient means in said housing urging said bearing rings toward each other to decrease the space between the rings and take up wear between the ball and ball socket, and a rod swivelly mounted in said bore of the ball member having abutment means thereon thrusting against said faces of the apertured bosses on the ball member.

9. A ball and socket joint construction comprising a housing having a laterally extending shank portion adapted to be connected to a rod or the like, and an open ended eye end portion, a pair of opposed bearing rings mounted in said eye end portion of the housing and cooperating with each other to define a ball socket, a ball in said ball socket having a bore therethrough, apertured bosses on opposite sides of said ball projecting beyond the open ends of said eye portion of the housing and having outer abutment faces, said bosses continuing said bore to said abutment faces, and means swivelly mounted in said bore of said ball member having shoulders thereon cooperating with said abutment faces of the bosses to retain said means in said bore.

ANTHONY VENDITTY.